US007700152B2

(12) United States Patent
Laine et al.

(10) Patent No.: US 7,700,152 B2
(45) Date of Patent: Apr. 20, 2010

(54) LIQUID FEED FLAME SPRAY MODIFICATION OF NANOPARTICLES

(75) Inventors: Richard M. Laine, Ann Arbor, MI (US); Julien Marchal, Ann Arbor, MI (US); José Azurdia, Guatemala (GT); Roy Rennesund, Auli (NO)

(73) Assignee: The Regents of the University of Michigan, Ann Arbor, MI (US)

( * ) Notice: Subject to any disclaimer, the term of this patent is extended or adjusted under 35 U.S.C. 154(b) by 1198 days.

(21) Appl. No.: 11/066,822

(22) Filed: Feb. 25, 2005

(65) Prior Publication Data

US 2006/0087062 A1 Apr. 27, 2006

Related U.S. Application Data

(60) Provisional application No. 60/548,729, filed on Feb. 27, 2004.

(51) Int. Cl.
*B05D 7/00* (2006.01)

(52) U.S. Cl. ...................................... 427/212; 427/226

(58) Field of Classification Search ................. 427/227, 427/215
See application file for complete search history.

(56) References Cited

U.S. PATENT DOCUMENTS 4,665,040 A * 5/1987 Kurita et al. ................ 501/105
5,788,738 A * 8/1998 Pirzada et al. ................ 75/331
5,958,367 A 9/1999 Ying et al.
2003/0121543 A1* 7/2003 Gratzel et al. ............... 136/252
2003/0185746 A1* 10/2003 Kajihara et al. ............. 423/625

FOREIGN PATENT DOCUMENTS

GB 2153807 * 8/1985
WO WO 03/070640 A1 8/2003
WO WO03070640 * 8/2003

OTHER PUBLICATIONS

Baranwal et al. (J. Amer. Ceram. Soc., 84, p. 951, 2001).*
Kang et al. (J. Colloid Interface Sci., 182, p. 59, 1996).*
Hinklin et al. (Chem. Mater., 16, p. 21, 2004, first published Dec. 16, 2003).*
U.S. Appl. No. 60/548,729, filed Feb. 27, 2004, Laine et al.
Trice et al., "Deformation Mechanisms in Compression-Loaded Stand-Alone Plasma-Sprayed Alumina Coatings," J. Am. Ceram. Soc. 83, 3057-64 (2000).
International Search Report and Written Opinion of the International Searching Authority, mailed Jul. 31, 2008, 9 pages.

* cited by examiner

*Primary Examiner*—Michael Cleveland
*Assistant Examiner*—Robert Vetere
(74) *Attorney, Agent, or Firm*—Brooks Kushman P.C.

(57) ABSTRACT

Nano- and micron sized metal oxide and mixed metal oxide particles are injected into a high temperature region wherein the temperature is between about 400° C. and less than 2000° C., and collected as particles or as coatings wherein a particulate nature is substantially maintained. The particles are altered in at least one of phase, morphology, composition, and particle size distribution, and may achieve further changes in these characteristics by coinjection of metal oxide precursor in liquid form.

14 Claims, No Drawings

LIQUID FEED FLAME SPRAY MODIFICATION OF NANOPARTICLES

CROSS-REFERENCE TO RELATED APPLICATIONS

This application claims the benefit of U.S. provisional application Ser. No. 60/548,729 filed Feb. 27, 2004, which is herein incorporated by reference.

STATEMENT REGARDING FEDERALLY SPONSORED RESEARCH OR DEVELOPMENT

The invention was made with Government support under AFOSR Contract No. F49620-03-1-0389. The Government has certain rights to the invention.

BACKGROUND OF THE INVENTION

1. Field of the Invention

The present invention is directed to modification of metal oxide particles by injection into a flame of moderate temperature by liquid feed flame spray techniques.

2. Background Art

Particles have been supplied into high temperature plasma or flames, i.e. above 2000° C., to melt or even vaporize the particles for use in preparing coatings. However, the art is silent regarding lower temperature processes whereby phase may be altered, for example a crystalline phase or an amorphous phase, or both, or whereby hollow or core/shell particle morphology may be created from particles in the micron range, and preferably those of nanometer size, while retaining their particulate nature.

There are numerous methods of preparing ultrafine, and nanosized oxide powders using chemical compounds as precursors. These methods are summarized in detail in "Mixed-metal Oxide Particles by Liquid Feed-flame Spray Pyrolysis of Oxide Precursors in Oxygenated Solvents," A. C. Sutorik, R. M. Laine, J. Marchal, T. Johns, T. Hinklin, WO 03/070640 A1 published Aug. 28, 2003, which is incorporated herein.

The literature also describes the injection of preformed particles, or occasionally their precursors, into a plasma or related high temperature flames, typically >2000° C., such that the particles are vaporized or fully melted to subsequently produce coatings such as thermal barrier coatings. In these instances, the particles are 10-50 μm diameter which are, in some instances, formed from nanosized particles in the range of 6-70 nm. The larger particles or precursors are typically injected off-axis into a plasma arc, and generally result in relatively smooth coatings, as the molten particles "splat" onto the substrate. A similar process has been used for many years to produce boules of alumina (sapphire, ruby).

Solution injection of precursors may also be used to prepare particles and/or coatings. In such processes, rapid evaporation of solvent initially forms more concentrated admixtures which then, under the high temperature pyrolysis conditions, further undergo such processes as breakup, precipitation, and/or gelation, followed by pyrolysis, sintering, and if the flame is hot enough, fusion. Often, the fused particles are much larger than the particles initially formed, as the result of forming agglomerates prior to fusion. The process is also useful for forming thermal barrier coatings. However, their particulate nature is substantially lost. Alumina, alumina/zirconia and also alumina/titania mixtures are used commonly for the formation of such thermal barrier coatings. In most instances, the alumina formed is the gamma phase with small amounts of alpha. For example, Trice et al., "Deformation Mechanisms in Compression-Loaded Stand-Alone Plasma-Sprayed Alumina Coatings," J. AM. CERAM. SOC. 83, p. 3057-64 (2000), obtain alumina systems wherein the alpha content is ≈10%.

It would be desirable to provide a process in which particles are obtained with morphologies and other characteristics which cannot be obtained by in situ formation of particles from liquid or gas phase precursors. It would be further desirable to uncouple the chemical makeup of such particles from that of their precursors. It would be further desirable to enable substrates to be coated with coatings wherein the particulate nature of the particles used in preparing the coating is retained.

Thus, in one aspect, the invention pertains to injection of nano-, ultrafine- and micron-sized ceramic oxide particles into low temperature (400-2000° C.) oxidizing, reducing or neutral flames individually, in combination with each other, or coinjected coincidentally or serially downstream, optionally also with chemical precursors, and as a result, their phases, particle sizes and size distributions, phase compositions and physical and chemical properties significantly modified by exposure to the flame and to the coinjected or serially injected materials. During the process, novel and unexpected particle morphologies and size distributions can be generated through the use of combinations of particles, or combinations of particles and precursors coinjected, or serially injected downstream from the initial liquid feed flame spray combustion unit. This process includes the coating of supports and substrates with combinations of metal oxides and metals for development of new catalysts, photonic materials, sensing materials, thermal barrier coatings, abrasion and corrosion resistant coatings, prosthetic ceramic materials, conducting materials, transparent ceramics, etc. In preferred aspects, the products may be α-alumina or combinations of α-alumina coated with other metal oxides or products of the reaction of γ- or α-alumina nanoparticles with coinjected or serially injected components including other metal oxide powders or precursors or combinations thereof; are large clay particles transformed to dense spherical or hollow spherical particles that can be coated with alumina or related hard ceramic nanopowders for applications ranging from novel abrasives to insulating packing materials for construction materials; metal oxide coatings on alumina, yttria, YAG, or titania, NiO or other transition, lanthanum or actinide or main group metal oxide such that the coatings can be modified to become catalytically active or electrically conducting, and may be transparent as well, for applications ranging from self-cleaning photocatalytic materials to fuel and fine chemical processing catalysts to antistatic and/or conducting coatings; and products wherein a glass, ceramic, metal or mixed phase material is placed such that the hot particles impinge on the heated surface and adhere to form coatings that are corrosion resistant, abrasion resistant, catalytically active, thermally robust, insulating, conducting or combinations thereof; while the particles remain substantially in particulate form, and are preferably either dense, porous, or exhibit a gradient from porous to dense or vice versa.

SUMMARY OF THE INVENTION

It has been surprisingly discovered that introduction of microparticles, preferably nanoparticles, into a flame with a temperature of from 400° C. to less than 2000° C., can produce novel compositions of matter, and may also be used to perform useful phase transformations not previously possible. In addition to particles with altered crystalline phase, particles having particles of different composition adhered to their surface may be formed, including metal oxide particles coated with metals. The products have a wide range of uses including the production of dense sintered ceramic materials, novel catalysts, applications in optoelectronics, etc.

DETAILED DESCRIPTION OF THE PREFERRED EMBODIMENT(S)

Thus, the present invention is broadly directed to a process for the preparation of particles by the injection of particles of a first composition and morphology into a high temperature zone ("flame") by liquid feed flame spray pyrolysis ("LSP") such that particles having a different composition and/or morphology are thereby obtained. The thusly obtained particles may be collected, or may impinge upon a "target" or "substrate" while in a particulate state such that the particulate character is maintained to a substantial degree; in other words, the particles are not fused to a state where upon impacting the target they "splat" or fuse, forming smooth or somewhat irregular continuous coatings, but instead strongly adhere in the form of discrete particles.

In more preferred embodiments, the preformed particles are injected into the high temperature zone along with liquid precursor of the same composition or a different composition. As a result, particles having a different morphology and/or composition than the initial particles are thereby formed. This different morphology and/or composition may take several forms. For example, the initial particles may be coated with solid derived from the liquid precursor; may comprise but a single phase with its composition derived from both the composition of the preformed particles and from the liquid precursor; may contain two or more distinct phases, e.g. crystalline phases of different composition or crystalline phases of the same composition but different crystal structures; or may contain particles of one or more phases enriched at the surface with elements or compounds derived from the precursor. By suitable selection of solvent dispersing media, solid particles of similar or identical composition but different morphology may be obtained, and hollow particles may also be obtained. By these techniques, unexpected changes in particle size and particle size distribution may also be obtained.

In all of the embodiments described herein, it is preferable that solid particles, i.e. particles having a size less than 100 μm, preferably less than 10 μm, and most preferably nanoparticles having a size less than 1 μm, preferably between 1 and 100 nm, be employed as the initial particles. These particles may be derived from numerous sources. They may, for example, be of natural origin, such as fine clay, diatomaceous earth, finely ground minerals such as bauxite, ash, for example fly ash, rutile, and garnet, or may be of wholly synthetic manufacture, for example particles produced by high temperature flame hydrolysis, liquid feed spray pyrolysis, solution precipitation, etc. Synthetic particles are preferred, most preferably metal oxides or mixed metal oxides prepared by high temperature flame processes, and most preferably metal oxides and mixed metal oxides which exhibit exceptional high temperature stability, such as silicates, and oxides and mixed oxides of transition metals, and especially of silicon, aluminum, and titanium, with or without additional elements such as the main group 1 and 2 elements, carbon, boron, phosphorous, arsenic, etc., the latter group generally in relatively low concentration. For example, carbon may be present in the form of carbides, while phosphorous, arsenic, boron, etc., may be dopants in a matrix of metal oxide, as also may be transition elements, particularly lanthanides and actinides, for example silica or titania doped with Ce, Pr, Nd, Yb, etc.

The concentration of solid particles in the liquid feed to the flame may be any concentration which is sufficiently pumpable and atomizable. The weight percentage will of course vary with the density of the particles. With respect to alumina particles, the lower range is not technically limited, but for economic reasons is preferably at least 0.1 weight percent. The upper limit is partially dependent on particle surface area, and for particles of low specific surface area, may range as high as 80% by weight. Ranges of 1 weight percent to 70 weight percent are more preferable, with weight percentages in the range of 5 to 20 weight percent being more preferred, each integral range between 1% and 80% being considered to be disclosed herein.

The flame temperature must be such that the desired particle morphology is obtained. The temperature will be within the range of 400 to 2000° C., more preferably 600 to 1800° C., and most preferably from about 800° C. to 1300 or 1400° C.

The high temperature zone may be provided by any convenient method. Such methods are well known to those skilled in the art. For example, the flame may be created by an oxyhydrogen torch, by combustion of liquid or gaseous fuels such as alkanes, alcohols, ketones, etc. in oxygen or oxygen diluted with air or nitrogen, may be provided by electrical discharge, for example an arc flame, or by any suitable procedure. Preferably, the flame is produced by burning of a combustible fuel, with or without hydrogen, in oxygen or oxygen diluted with air, nitrogen, inert gas, water, etc.

The flame stoichiometry may be adjusted to provide an oxidizing or reducing atmosphere, or may be neither oxidizing nor reducing. Additional elements or compounds may be fed to the flame so as to incorporate additional elements into the particles or to modify the particles composition and/or morphology by their presence. Examples include halogens, metal halides, tin compounds, chalcogenides, and the like. Injection of such components may take place at any time, for example concurrently with particle introduction and/or subsequent thereto.

The process is capable of producing coatings on substrates such as metal, glass, ceramics, and even high melt temperature thermoplastics, which are durable and abrasion resistant.

In patent publication WO 03/070640 published on Aug. 28, 2003, it is suggested that mixed metal oxide particles may be produced by sequential FSP units with the second being fed additional or different dissolved precursor material. Dispersing nanoparticles with rich OH surface functionality into oxygenated solvents is also disclosed. However, there is no indication that the temperature range be restricted to temperatures below 2000° C., nor are the results actually obtained those which are predicted by the publication, which also does not suggest use of previously prepared particles.

Particles can be injected into a low temperature (400-2000° C.) flame and their properties significantly modified by exposure to the flame and to materials coinjected with the particles. Novel particle size distributions may be created through the use of combinations of particles, or combinations of particles and precursors may be coinjected or injected serially downstream from the initial liquid feed flame spray combustion unit. This process includes the coating of supports and substrates with combinations of metal oxides for development of new catalysts, photonic materials, sensing materials, thermal barrier coatings, abrasion and corrosion resistant coatings, prosthetic ceramic materials, conducting materials, transparent ceramics, etc.

The current invention demonstrates that the concepts espoused in the earlier patent often do not occur and, furthermore, different and unusual events occur that are inconsistent with what is suggested. It is instructive to demonstrate this through a discussion of efforts to produce chromia coated alumina using liquid-feed flame spray pyrolysis (LF-FSP) methods but using solid alumina particle suspensions as the primary feed with coinjected chromia precursors.

LF-FSP of pure $Cr(O_2CCH_2CH_3)_3$ precursor (0.5 wt. % $Cr_2O_3$ solids loading) dissolved EtOH gives simple green nanopowders of $Cr_2O_3$ (40 nm average particle size by BET) with the XRD pattern exactly that expected for α-phase $Cr_2O_3$. In contrast, LF-FSP of a 92:08 mixture of particulate δ-alumina:$Cr_2O_3$ as $Cr(O_2CCH_2CH_3)_3$ precursor in EtOH results in the production of very slightly off-white nanopowders with a size distribution ranging from nanosized to micron sized. XRD line broadening analysis indicates that the agglomerates actually consist of nanopowder particles 60 nm in diameter. Thus, efforts were made to break up the agglomerates.

The larger particles are readily separated from the fine particles by simple sedimentation in water after 2 minutes. The larger particles appear to be only lightly agglomerated because they can be suspended in EtOH and sonicated (800 Watts/1 h). After sonication, the agglomerates are broken up and the resulting powder now remains suspended in EtOH for lengthy periods where before ultrasonication it did not. Sedimentation of the powders after sonication gives top and bottom fractions. The top fraction turned slightly green and the bottom fraction slightly red as the $Cr^{2+}$ ions were oxidized to $Cr^{3+}$ ions. The red color is common for $Cr^{3+}$, attributable to d-d transitions, as seen in ruby where $Cr^{3+}$ ions are part of the α-alumina lattice.

The phases present in these samples were mainly α and δ* $Al_2O_3$ while no Cr species were observed. The relative amounts of each $Al_2O_3$ phase were, for the top and bottom respectively 68% and 56% ν-$Al_2O_3$.

If a $Cr_2O_3$ coating had formed, one would expect the same dark green color, and the XRD should easily have shown 8 wt. % α-$Cr_2O_3$ on alumina. The absence of a $Cr_2O_3$ coating, yet the obvious oxidation to $Cr^{3+}$ ions indicates that the chromium precursor decomposes during LF-FSP and becomes incorporated into the alumina to some depth but not to the point where it cannot be oxidized. A further important change was the observation of α-alumina. In all previous studies that generated alumina nanoparticles, the only phases observed are γ-alumina or δ-alumina.

The observation that the nano δ-alumina is partially converted to α-alumina is surprising and unexpected. It would be expected that the formation of γ-alumina is driven by the fact that this phase is not as dense as α-alumina and the high surface energies of the nanoparticles actually drive the preferred formation of this phase. However, it has now been discovered that by further processing we can transform materials from nanoalumina that is primarily either γor 6 phase to nanoparticles that are primarily α-alumina.

This discovery is very important because most articles made of alumina worldwide are produced by sintering one of the many transition aluminas to fully dense α-alumina. Because this process involves changes in phase, crystal structures, densities and crystallographic orientations, it is very difficult to get fully dense materials. Indeed, previous attempts to sinter LF-FSP produced δ-alumina to full density gave very porous materials. For example, compacts of δ-alumina 55% dense (as green compacts) were heated (10° C./min/air) to 1200° C. (2 h hold). The resulting α-alumina is highly porous with a relative density of only 60%.

Clearly, it is difficult to sinter transition aluminas to full density. Thus, it would be advantageous to make fine α-alumina powders. Furthermore, given that nanopowders are known to sinter at much lower temperatures than micron sized powders, it would be further advantageous to make easily dispersable α-alumina nanopowders.

Since at least part of the alumina powders transformed to α-alumina, conditions were sought wherein the majority of the δ-alumina powders could be converted to α-alumina nanopowders, specifically to convert δ-alumina nanopowders available from Degussa to α-alumina nanopowders. Thus, a suspension of 40 g of δ-alumina (30 nm ave. particle size, 60 $m^2/g$) were sonicated in 4 l of 50 vol % EtOH/50 vol % ButOH for 30 min. The resulting suspension, about 1 wt. % δ-alumina was aerosolized with $O_2$ and ignited with a $CH_4$ torch at 25 g/h employing the apparatus described in U.S. Pat. No. 5,958,367, FIGS. 3-5, herein incorporated by reference, and collected downstream in electrostatic precipitators (ESPs).

Similarly, a suspension of 40 g of Degussa γ-alumina was sonicated in 4 l of 50 vol % EtOH/50 vol % nBuOH for 30 min. The resulting suspension, about 1 wt. % γ-alumina was aerosolized with $O_2$ and ignited with a $CH_4$ torch at ≈25 g/h collected downstream in electrostatic precipitators. The general morphology of the as-received powders is completely different from the morphology of the processed powders.

XRDs show the starting Degussa δ-alumina to be >70% δ-$Al_2O_3$, the remaining material being θ-$Al_2O_3$. The Degussa δ-$Al_2O_3$ has a surface area of 100 $m^2/g$ and average particle size (APS) of ≈20 nm. The resulting powders have surface areas of 60 $m^2/g$ and APS of 40-60 nm. SEMs of these materials show essentially no features. The as-produced treated powders contain some fraction of larger particles, which can be separated by simple sedimentation, or because they are soft agglomerates, can be broken down by ultrasonication as above. Sedimentation provides rather uniform particles. However, by controlling the conditions, it is possible to produce products where no large particles are obtained.

It is important to note here that the method of injection of the nanopowders into the flame does not have to be by coinjection. It can also be done by serial injection, but with control of the flame temperature at the point of injection so that it is between about 400° and about 2000° C. Furthermore, it could also be done through use of a second flame directly after the initial LF-FSP production of either the δ-alumina or γ-alumina powders.

In some instances it is preferred to have some larger particles present to aid in the green compaction process. The following figure shows that mixtures of larger and finer particles give higher green densities than single powders alone. This can aid in sintering to full density. The FTIR data for the particles indicates that the treated particles are more crystalline.

FTIR also shows ν O—H vibrations for the Degussa γ-alumina, which are typical of a highly hydrated surface and mostly physisorbed water. In contrast, the LF-FSP treated materials have only small amounts of isolated chemisorbed OH groups. These results are extremely important for the following reasons:

1. Because of the numerous phase, density and morphology changes that occur in sintering most current industrial forms of $Al_2O_3$ it is extremely difficult to get full density without extensive manipulation of the powders and any compact shapes.

2. The availability of a simple source of α-$Al_2O_3$ will make it easier to produce transparent envelopes for sodium vapor lamps which are used worldwide for outdoor lighting.

3. The availability of a source of nano α-$Al_2O_3$ makes it possible to make high strength artifacts ranging from transparent armor to radomes to artificial hip and knee implants.

4. The availability of high surface area nano $\alpha$-$Al_2O_3$ will be very important in making sinter resistant catalyst supports.

It has been demonstrated that LF-FSP processing of mixtures of $[Al(OCH_2CH_2)_3N)]$ alumatrane and Tyzor TE $[(Me_2CHOTi(OCH_2CH_2)_3N)]$ at 16 mol % alumina:84 mol % titania resulted in the production of a material that was essentially all rutile phase in contrast to the $90^{+}$% anatase phase produced with pure Tyzor TE. Given the ability to form a homogeneous phase using a chromia precursor with δ-alumina above, investigations were made to see if novel rutile phase $(TiO_2)_{0.85}(Al_2O_3)_{15}$ materials which offer unique bandgap behavior of value for photoactive self-cleaning catalyst surfaces and self-disinfecting surfaces could be made. Surprisingly, LF-FSP of 80 wt. % $\alpha$-alumina particles:20 wt. % $TiO_2$ (as Tyzor TE) did not give a single phase, but produced coated $\alpha$-alumina particles. The product consists of $\alpha$-alumina with rutile as the majority titania phase. If free $TiO_2$ had been produced simultaneously, the product would have contained the anatase phase nearly exclusively. In contrast, using the $\alpha$-alumina as the coinjected particle, the product consists of a mixture of $\alpha$-alumina and a poorly crystalline titania phase.

In view of the results just described, investigations were made to determine if larger particles could also be passed through the LF-FSP system. Efforts focused on easily suspended colloidal clays as starting materials. By suspending micron-sized clay particles in the feed stream, these were able to be partially or completely melted, as a result of which their morphology changed. From an irregular morphology often containing platelets and crystal-like aggregates, substantially round particles were obtained, the specific surface ("SSA") changed.

Typical SSAs of clay samples after LF-FSP at temperatures >1500° C. are:

| | Sample | | | | |
|---|---|---|---|---|---|
| | 1 | 2 | 3 | 4 | 5 |
| SSA ($m^2/g$ | 8.3 | 7.8 | 8.7 | 5.5 | 6.2 |

From the above data it can be seen that the particles following LF-FSP processing are now spherical and photomicrographs show average particle sizes less than 10 μm. Furthermore, the water content present as chemi- and physisorbed water has been mostly eliminated as shown by FTIR, where the O—H stretching vibrations in the 3300-3600 $cm^{-1}$ range are substantially eliminated.

Surprisingly, colder flame temperatures achieved by using fuel/water mixtures give hollow particles instead of solid spherical particles. Furthermore, by coinjecting δ-alumina the clay may be coated with alumina. This offers many opportunities for making insulating materials, composites, abrasives etc. The idea that we could coat larger particles with smaller nanoparticles suggested that we can coat surfaces the same way.

By placing surfaces in or near the flame, they can be coated with nanopowders without formation of splat droplets. Thus, a sample of 316 SS was placed near a flame containing coinjected γ-alumina particles. After just a few seconds the piece of steel was removed and cooled. The sample had an iridescent coating of particles as shown by SEM images. These coatings could not be removed by rubbing with abrasive media. The thickness and quality of the coatings depend on the conditions used. Longer times will give thicker but uneven coatings. The particles can be distinctly seen, however, without the formation of a continuous coating.

The following general methods were used to process the materials in the examples.

Materials

Titanatrane isopropoxide or Tyzor TE $[(Me_2CHOTi(OCH_2CH_2)_3N)]$ was purchased from Dupont. Ethanol was purchased from standard sources and used as received. Gamma alumina powders were received from Degussa and δ-alumina powders were prepared from the LF-FSP of alumatrane, $Al(OCH_2CH_2)_3N$.

LF-FSP Methods

The systems used in the production of coated or coreacted or coinjected or serially reacted nanopowders or micron sized powders, are unique. The powders once suspended must be pumped and subsequently aerosolized using a pump system that will not be abraded by the suspended particles through an aerosolizer that can be an ultrasonic atomizer or a bernouli mister or other similar misters that can mix the powder suspension with oxygen or air or even an inert gas such that droplets less than about 50 microns are generated. Alternately, the powders and/or precursors can be serially injected as a liquid or air suspension into the flame.

The combustion process can use the suspending medium as fuel which can include oxygenates such as methanol, ethanol, propanol, or other linear or branched alcohol or tetrahydrofuran or dimethoxyethane or dimethoxydiethyleneglycol or other fuel that has a low viscosity, lower than about 300 cp at temperatures less than about 200° C. Water can be used as a co-suspending medium or as the sol-medium. When water or other non-combusting solvent is used, then combustion must be promoted through use of a combustible gas or easily volatilized organic such as natural gas or methane, ethane, propane, butane, hexanes, methanol, ethanol, tetrahydrofuran etc. or mixtures thereof. Alternately, hydrogen can be combusted. Combustion in systems with less than about 50 vol % fuel used as the suspending medium may require co-combustion of combustible gas and/or hydrogen.

Flow rates of suspended particles in a combustible medium can be controlled to control the flame temperature to about 400° to less than 2000° C. Flow rates of suspended particles in a noncombusting medium can be controlled by both the flow rate of the suspending medium and the amount of combustible gas metered into the combustion system. The temperature is usually adjusted so as to avoid fusion of the particles, although in some cases, fusion may be desired, as long as the resulting particles solidify prior to collection.

Alternately, particles and/or precursors can be entrained in separate gas flows and injected tangentially, but at temperatures between about 400° and 2000° C.

Typical LF-FSP processing. Typically a 2-20 wt. % ceramic yield solution of suspended particles with or without coinjected or serially injected precursor in a suspending medium is atomized at ≈30 ml/min in an ultrasonic atomizer with oxygen or air to generate an aerosol that is ignited via methane/oxygen pilot torches in the device's ignition chamber. Alternately, the powder can be introduced separately into the flame via entrainment in a gas. Combustion occurs at temperatures <2000° C. producing selected products as described in the Examples below, and gaseous byproducts. A steep temperature gradient, >500° C./sec, between the combustion chamber and the 300° C. collection point (≈1.5 m) provides rapid quenching, as the powders are carried away from the combustion zone at relatively high velocities, for example by an air flow of <700 cfm using an inline radial pressure blower. Rapid quenching is necessary to maintain dispersable, powders and small particle sizes with a minimum of particle necking. The powders are collected downstream in electrostatic precipitators (ESPs) or a bag house or cyclone filter.

EXAMPLE 1

Approximately 46 g of δ-alumina was sonicated in 4 l of 50% EtOH/50% ButOH for 2 h. To this was added $Cr(O_2CCH_2CH_3)_3$ precursor (0.1 wt. % $Cr_2O_3$ solids loading) dissolved in EtOH. The resulting 92:8 wt. % $Al_2O_3$:$Cr_2O_3$ as precursor mixture was aerosolized with $O_2$ and ignited with a methane torch at 25 g/h of powder collected downstream in ESPs.

LF-FSP of pure $Cr(O_2CCH_2CH_3)_3$ precursor (0.5 wt. % $Cr_2O_3$ solids loading) dissolved in EtOH gives simple green nanopowders of $Cr_2O_3$ (40 nm average size by BET) with the XRD pattern exactly that expected for α-phase $Cr_2O_3$. The 92:8 wt. % $Al_2O_3$:$Cr_2O_3$ as precursor system gave mostly α-alumina with no evidence of an α-$Cr_2O_3$ phase.

EXAMPLE 2

A 1 wt. % suspension of 40 g δ-alumina with particle sizes of 20-40 nm and surface areas of 60 $m^2$/g in 4 l of EtOH/ButOH 50/50 is subjected to LF-FSP at rates of 4 L/h. The resulting powder is converted to mixtures of α- and θ-alumina.

EXAMPLE 3

A 1 wt. % suspension of 40 g γ-alumina with particle sizes of <20 nm and surface areas of ≈110 $m^2$/g in 4 l of EtOH/ButOH 50/50 is subjected to LF-FSP at rates of 4 L/h. The resulting powder is converted to mixtures of α- and θ-alumina.

EXAMPLE 4

Alpha alumina powders (15 g) were mixed with Tyzor TE to make a composition of 80 mol % alumina-20 mol % titania. 400 ml of EtOH were added and the solution was ultrasonically dispersed for 5 min, and then 2500 ml of EtOH was added with stirring at 20° C. for at least 30 min. Following LF-FSP, the resulting particles consisted of α-alumina coated with rutile.

EXAMPLE 5

Delta alumina powders (15 g) were mixed with Tyzor TE to make a composition of mol % alumina-20 mol % titania. 400 ml of EtOH were added and the solution was ultrasonically dispersed for 5 min, and then 1250 ml of nBuOH and 1250 ml of EtOH were added with stirring at 20° for at least 30 min. Following LF-FSP, the resulting particles consisted of α-alumina and a nondescript titania doped phase.

EXAMPLE 6

Delta alumina powders (2 g) were mixed with Tyzor TE to make a composition of mol % alumina-85 mol % titania. 400 ml of EtOH were added and the solution was ultrasonically dispersed for 5 min, and then 1250 ml of nBuOH and 1250 ml of EtOH were added with stirring at 20° for at least 30 min. The products analyzed by XRD were found to be only alumina doped titania very similar to that produced solely by LF-FSP of precursors without nanopowder coinjection.

EXAMPLE 7

Alpha alumina nanopowder produced as above (75 wt. % phase pure) 15 g was dispersed in 4 l of a 50/50 (volume) EtOH/nBuOH solution. 125 g of yttrium propionate (4 wt. % ceramic) was added. The total ceramic loading was 0.5 wt. % with a ratio of 75 wt. % ν-$Al_2O_3$:25 wt. % $Y_2O_3$ as yttrium proprionate. This mixture was processed through LF-FSP at the rate of 20 g/h.

The XRD shows that the resulting powder is mostly monoclinic $Al_2Y_4O_9$ (YAM), although $YAlO_3$, Cubic $Y_2O_3$ are also observed in smaller quantities. This suggests a reaction between the alumina particle surface and the yttrium ions in the flame, forming a YAM coating around an alumina core. The nanoparticles are lightly agglomerated.

EXAMPLE 8

Degussa δ-alumina, 15 g was dispersed in 4 l of a 50/50 (volume) EtOH/nBuOH. 125 g yttrium propionate (4 wt. % ceramic) was added. The total ceramic loading was 0.5 wt. % with a 75 wt. % δ-$Al_2O_3$:25 wt. % $Y_2O_3$ (as yttrium proprionate) ratio. This mixture was processed through the LF-FSP at ≈20 g/h.

XRD of resulting powder indicates that the powder is almost phase pure $YAlO_3$ I with minor amounts of YAM and α-alumina. This indicates a reaction between the yttrium ions in the flame and the alumina particles. Contrary to the above example, the production of $YAlO_3$ I indicates better mixing than obtained with α-alumina, likely a combination of the higher thermal stability of this alumina phase and the higher surface area/smaller particle size of the γ-alumina as indicated by the Y/Al ratio of $YAlO_3$ I.

EXAMPLE 9

Delta alumina nanopowder, 15 g was dispersed in 4 l of a 50/50 (vol) EtOH/nBuOH. 41.3 g of yttrium propionate (12 wt. % ceramic) was added. The total ceramic loading was 0.5 wt. % at a 75 wt. % ν-$Al_2O_3$:25 wt. % $Nd_2O_3$ as neodymium proprionate ratio. This mixture was LF-FSP processed at ≈20 g/h. The product appears to be pure $NdAlO_3$.

EXAMPLE 10

Core shell powders were produced by mechanically mixing a 12% ceramic wt. Ni propionate precursor with 15 g of δ*-$Al_2O_3$ powders followed by LF-FSP.

A sample with a slight blue-green cast was produced. The sample was dispersed using an ultrasonic horn (800 W for 1 h) and left to sediment for 12 h after which the top fraction of the dispersed solution was separated from the bottom fraction. These were then dried at 80° C. for 24 h and analyzed using XRD.

Both fractions show essentially the same result. The main XRD peaks correspond to NiO and a minor phase identified as δ*-$Al_2O_3$. The absence of sedimentation differences suggests that all of the alumina particles were coated with a NiO layer, rather than there being separate NiO and $Al_2O_3$ particles. SEM show nearly identical size distributions, morphologies and sizes between the top and bottom fractions. These materials offer considerable potential for use in numerous catalyst applications because the support is coated with the metal.

Clay Examples

Clay suspension precursors were prepared by placing 25 g of clay in a 250 mL PVP bottle, with 180 ml EtOH and 100 g of alumina milling media. Each precursor was then milled for 48 h and filtered. The resulting suspension was diluted with EtOH to give 4 L batches of suspension.

FSP. The apparatus used for FSP consists of an aerosol generator, a combustion chamber and an electrostatic powder collection system. The precursor solution is pumped through an aerosol generator at a rate of 100 mL/min. The solution is atomized with $O_2$ to form an aerosol and ignited by two methane/oxygen pilot torches, while the pressure in the system was kept at 7.5 psi. Combustion produces temperatures of about 400-2000° C. The particles are collected in ESPs. The production rate was typically ca. 30 g/h.

EXAMPLE 11

Clay suspension precursors were prepared by placing 25 g of clay in a 250 mL PVP bottle, with 180 ml of 50:50 EtOH:$H_2O$ and 100 g of alumina milling media as above.

FSP. The precursor solution is pumped through an aerosol generator at a rate of 100 mL/min. The solution is atomized with $O_2$ to form an aerosol and ignited by two methane/oxygen pilot torches, while the pressure in the system was kept at 7.5 psi. Combustion produces temperatures >800° C. and the particles are collected in ESPs.

EXAMPLE 12

Clay suspension precursors were prepared by placing 25 g of clay in a 250 mL PVP bottle, with 180 ml of 50:50 MeOH:$H_2O$ and 100 g of alumina milling media.

FSP. The precursor solution is pumped through an aerosol generator at a rate of 100 mL/min. The solution is atomized with $O_2$ to form an aerosol and ignited by two methane/oxygen pilot torches, while the pressure in the system was kept at 7.5 psi. Combustion produces temperatures >800° C. and the particles are collected in ESPs. The particles are predominately hollow spheres.

EXAMPLE 13

Clay suspension precursors were prepared by placing 25 g of clay in a 250 mL PVP bottle, with 180 ml of 25:75 MeOH:$H_2O$ and 100 g of alumina milling media.

FSP. The precursor solution is pumped through an aerosol generator at a rate of 100 mL/min. The solution is atomized with $O_2$ to form an aerosol and ignited by two methane/oxygen pilot torches, while the pressure in the system was kept at 7.5 psi. Without the methane, combustion does not occur. Combustion produces temperatures >400° C. and the silica particles are collected in ESPs at ≈30 g/h.

EXAMPLE 14

Clay suspension precursors were prepared by placing 25 g of clay in a 250 mL PVP bottle, with 180 ml of 25:75 MeOH:$H_2O$ and 100 g of alumina milling media.

FSP. The precursor solution is pumped through an aerosol generator at a rate of 100 mL/min. The solution is atomized with $O_2$ to form an aerosol and ignited by two hydrogen/oxygen pilot torches, while the pressure in the system was kept at 7.5 psi. Without the hydrogen, combustion does not occur. Combustion produces temperatures >400° C. and the particles are collected in ESPs typically at ≈30 g/h.

EXAMPLE 15

Coatings of nanoparticles on glass, ceramic, and metal components can be made by exposing the required substrate to the product stream from Example 1 or any other Example above, such that the temperatures are sufficient to cause particle adhesion to the substrate surface without significantly altering its properties. The resulting coatings can be abrasion resistant, catalytically active, corrosion resistant, adhesive to second coating materials or for joining dissimilar materials.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the modification of particles comprising metal oxide and mixed metal oxides having a number average particle size of less than 100 μm, comprising:

a) injecting preformed particles in a flow of suspending medium through a high temperature zone having a temperature greater than 400° C. and less than 2000° C.;

b) optionally coinjecting a liquid composition comprising one or more metal oxide precursor compounds;

c) rapidly quenching the particles to obtain product particles or coatings of product particles wherein at least one of composition, phase, morphology, particle size, or particle size distribution is modified.

2. The process of claim 1, wherein said temperature is between 600° C. and 1400° C.

3. The process of claim 1, wherein minimally two different types of particles are co-injected and the product particles collected are substantially of a single type containing constituents of each of the different types of co-injected particles; are particles of one type having particles of a second type fused thereto; or are a mixture of these types of particles.

4. The process of claim 1, wherein the product particles, following at least partial quenching in step c), impact a target substrate and adhere thereto, substantially retaining their particulate nature and not forming a continuous coating.

5. The process of claim 1, wherein the step (c) further includes rapidly quenching the particles at a rate of no less than 500° C. per second.

6. A process for the modification of particles comprising metal oxide and mixed metal oxides having a number average particle size of less than 100 μm, comprising:

a) injecting preformed particles in a flow of suspending medium through a high temperature zone having a temperature greater than 400° C. and less than 2000° C.;

b) coinjecting a liquid composition comprising one or more metal oxide precursor compounds;

c) rapidly quenching the particles to obtain product particles or coatings of product particles wherein at least one of composition, phase, morphology, particle size, or particle size distribution is modified.

7. The process of claim 6, wherein said metal oxide precursor is injected serially with relation to the point of injection of the preformed particles.

8. The process of claim 6, wherein the product particles collected in step c) comprise particles of uniform composition comprising the same metal oxide(s) of the preformed particles and metal oxide(s) derived from pyrolysis of the metal oxide precursor(s).

9. The process of claim 6, wherein the product particles collected in step c) comprise particles of at least two phases, at least one phase comprising metal oxide(s) derived from pyrolysis of the metal oxide precursor(s).

10. The process of claim 6, wherein the product particles comprise an outer phase enriched with metal oxide(s) derived from pyrolysis of the metal oxide precursor(s).

11. A process for the modification of particles comprising metal oxide and mixed metal oxides having a number average particle size of less than 100 μm, comprising:

a) injecting preformed particles in a flow of suspending medium through a high temperature zone having a temperature greater than 400° C. and less than 2000° C.;

b) optionally coinjecting a liquid composition comprising one or more metal oxide precursor compounds;

c) rapidly quenching the particles to obtain product particles or coatings of product particles wherein at least one of composition, phase, morphology, particle size, or particle size distribution is modified, wherein the preformed particles are of γ-alumina, δ-alumina, θ-alumina, or mixtures thereof, and the particles collected in step c) are α-alumina or are enriched with α-alumina relative to the α-alumina content of the preformed particles.

12. A process for preparing a high density sintered alumina article, comprising:

1) preparing sinterable product particles comprising α-alumina by the process of claim 11;

2) preparing a green body from said sinterable particles; and 3) sintering said green body to produce an alumina article having a density of greater than 60% of theoretical fully dense alumina.

13. A process for the modification of particles comprising metal oxide and mixed metal oxides having a number average particle size of less than 100 μm, comprising:

a) injecting preformed particles in a flow of suspending medium through a high temperature zone having a temperature greater than 400° C. and less than 2000° C.;

b) optionally coinjecting a liquid composition comprising one or more metal oxide precursor compounds;

c) rapidly quenching the particles to obtain product particles or coatings of product particles wherein at least one of composition, phase, morphology, particle size, or particle size distribution is modified, wherein the preformed particles comprise particles of clay or ash.

14. The process of claim 13, wherein clay particles are the preformed particles, and the product particles comprise hollow spheres.

* * * * *